United States Patent [19]

Seike et al.

[11] Patent Number: 5,418,869
[45] Date of Patent: May 23, 1995

[54] OPTICAL FIBER-TYPE WAVE-DIVIDER-MULTIPLEXER

[75] Inventors: Takeo Seike; Satoshi Endo, both of Kanagawa, Japan

[73] Assignee: Sumitomo Electric Industries, Ltd., Osaka, Japan

[21] Appl. No.: 230,872

[22] Filed: Apr. 20, 1994

Related U.S. Application Data

[63] Continuation of Ser. No. 26,033, Mar. 4, 1993, abandoned.

[30] Foreign Application Priority Data

Jun. 24, 1992 [JP] Japan .................. 4-189888

[51] Int. Cl.⁶ .................. G02B 6/28; G02B 6/42
[52] U.S. Cl. .................. 385/24; 385/15;
385/42; 385/43; 385/50; 385/51; 385/88;
385/89; 385/96; 385/99; 359/113; 359/114;
359/115; 359/124; 359/127
[58] Field of Search .................. 385/14, 16, 15, 18,
385/24, 31, 43, 42, 50, 51, 44, 73, 76, 78, 77, 88,
89, 95, 96, 99; 359/113, 114, 114, 124, 127

[56] References Cited

U.S. PATENT DOCUMENTS

| | | | |
|---|---|---|---|
| 4,878,731 | 11/1989 | Caron et al. | 385/78 X |
| 4,900,118 | 2/1990 | Yanagawa et al. | 385/24 X |
| 5,050,954 | 9/1991 | Gardner et al. | 385/16 X |
| 5,078,465 | 1/1992 | Dahlgren | 385/50 |
| 5,098,804 | 3/1992 | Booth | 385/16 X |
| 5,309,534 | 5/1994 | Cohen et al. | 385/27 |
| 5,339,374 | 8/1994 | Murbhy et al. | 385/43 |
| 5,343,542 | 8/1994 | Kash et al. | 385/31 |
| 5,355,426 | 10/1994 | Daniel et al. | 385/39 |
| 5,361,383 | 11/1994 | Chang et al. | 385/27 |

OTHER PUBLICATIONS

Kawakami, New Glass, Optical Fiber Coupler, vol. 6, No. 1, 1991, pp. 48–59.

"Filter-Embedded Design and Its Applications to Passive Components," H. Yanagawa et al., Journal of Lightwave Technology, vol. 7, No. 11, Nov. 1989, pp. 1646–1653.

Patent Abstracts of Japan, vol. 11, No. 370, Dec. 3, 1987, p. 642, JP-A-62 141 506.

Patent Abstracts of Japan, vol. 14, No. 430, Sep. 1990, p. 1106, JP-A-02 167 507.

Primary Examiner—Brian Healy
Attorney, Agent, or Firm—Foley & Lardner

[57] ABSTRACT

In a fixing portion of an optical fiber-type wave-divider-multiplexer, an optical fiber glass portion is fixed to a fixing member by an adhesive. A groove reaching at least a core portion of the optical fiber is cut from the fixing member. This groove may be cut up to a position where the optical fiber is cut across. An optical filter is inserted into the cut groove, and is fixed by an adhesive or the like. As a result, the optical fiber can be provided with light passing characteristics corresponding to the characteristics of the optical filter.

4 Claims, 3 Drawing Sheets

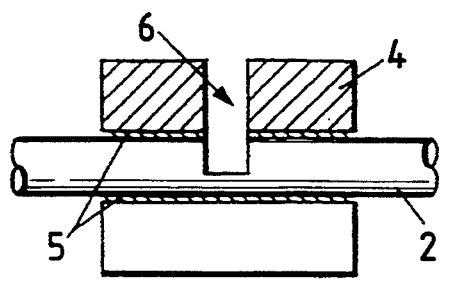
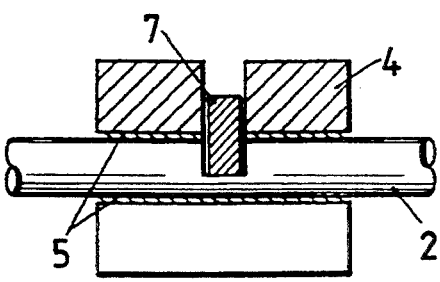
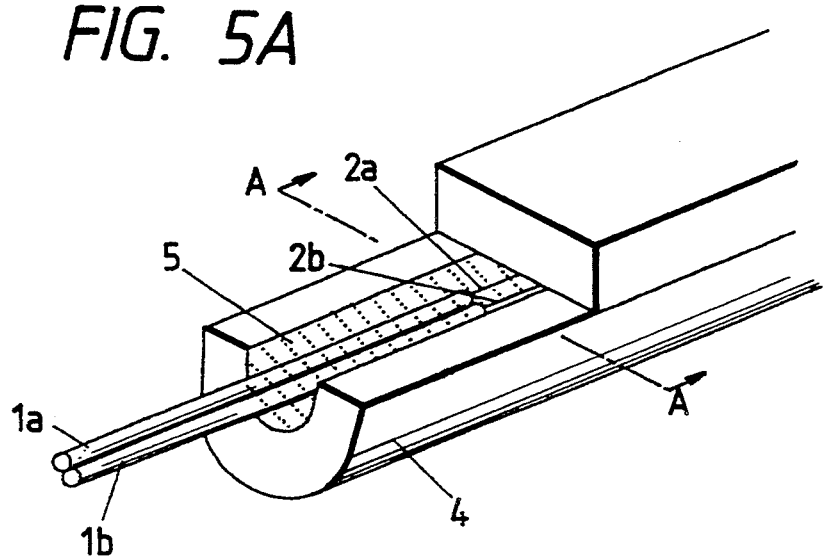
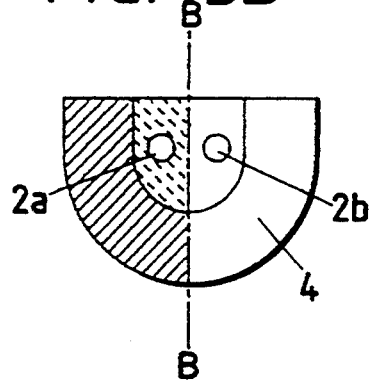
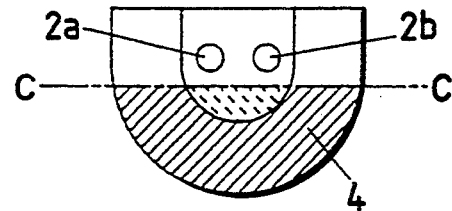

FIG. 6
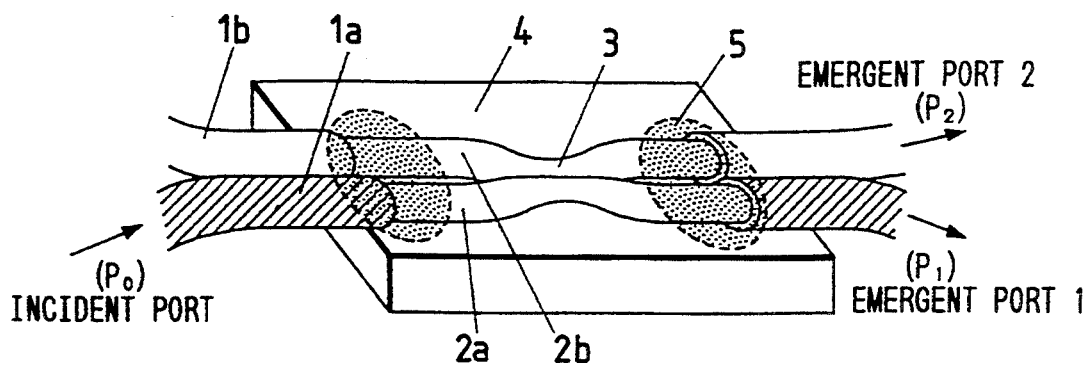
FIG. 7
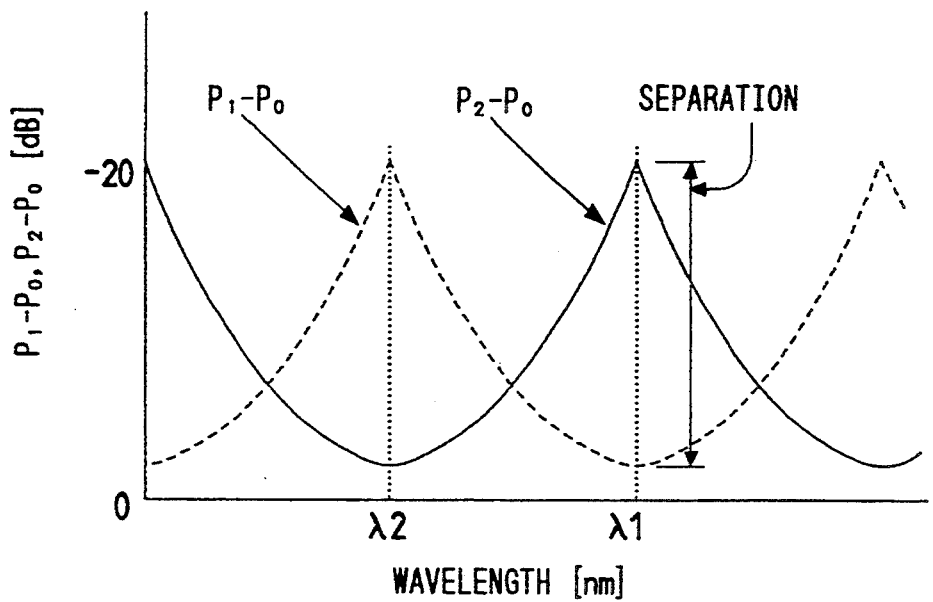
FIG. 8
|  | CONVENTIONAL | PRESENT INVENTION |
|---|---|---|
| WAVELENGTH ISOLATION BETWEEN 1.3μm AND 1.55μm [dB] | 15 | 60 |
| INSERTION LOSS [dB] (EXCLUDE OPTICAL CONNECTOR LOSS) | 0.5 | 1.3 |

OPTICAL FIBER-TYPE WAVE-DIVIDER-MULTIPLEXER

This application is a continuation of application Ser. No. 08/026,033, filed Mar. 4, 1993, now abandoned.

BACKGROUND OF THE INVENTION

1. Field of the Invention

The present invention relates to an optical fiber-type wave-divider-multiplexer for dividing and multiplexing light of a plurality of wavelengths, and more particularly to an optical fiber-type wave-divider-multiplexer whose wavelength isolation performance is improved.

2. Description of Conventional Art

As a wave-divider-multiplexer (WDM) for dividing and multiplexing the light of different wavelengths among a plurality of optical fibers, an optical fiber-type wave-divider-multiplexer using optical fibers is known. Referring to FIG. 3, a description will be given of an example of a configuration of an optical fiber line using the optical fiber-type WDM which makes use of two wavelengths. In the drawing, reference numerals 11 and 12 denote optical fiber-type WDMs; numeral 13 denotes an optical communication line; reference characters a and b denote coupled points; $T_{x1}$ and $T_{x2}$ denote light transmitters; and $R_{x1}$ and $R_{x2}$ denote light receivers. Ends of optical fibers from the optical fiber-type WDM 11 and 12 are coupled to an optical fiber of the optical communication line 13 at the points a and b.

FIG. 3A shows a configuration of one-way communication. In this example, optical signals from the light transmitter $T_{x1}$ for transmitting a 1300 nm wavelength and from the light transmitter $T_{x2}$ for transmitting a 1550 nm wavelength are combined into one optical signal by the optical fiber-type WDM 11 so as to be transmitted via one communication line 13. On the receiving side, the light receiver $R_{x1}$ for receiving the 1300 nm wavelength and the light receiver $R_{x2}$ for receiving the 1550 nm wavelength are coupled to the optical fiber-type WDM 12. The optical signal transmitted from the optical communication line 13 is divided into the respective wavelengths by the optical fiber-type WDM 12, and are received by the respective light receivers $R_{x1}$ and $R_{x2}$. In this example, one optical communication line can be used as one-way communication line. In this case, the optical fiber-type WDM 11 is used as a multiplexer, while the optical fiber-type WDM 12 is used as a divider.

FIG. 3B shows an optical fiber line for two-way communication. In this example, transmission and reception between the respective terminals can be effected by using the 1300 nm wavelength and the 1550 nm wavelength. That is, one terminal has the light transmitter $T_{x1}$ for transmitting the 1300 nm wavelength and the light receiver $R_{x2}$ for receiving the 1550 nm wavelength. In contrast, the other terminal has the light transmitter $T_{x2}$ for transmitting the 1550 nm wavelength and the light receiver $R_{x1}$ for receiving the 1300 nm wavelength. Accordingly, communication from one terminal to another can be effected by the optical fiber-type WDMs 11 and 12 by the 1300 nm wavelength, while communication from the other terminal to one terminal can be effected by the optical fiber-type WDMs 12 and 11 by the 1550 nm wavelength. In this example, transmission and reception can be mutually effected by one optical communication line. In this case, it can be said that the optical fiber-type WDMs 11 and 12 are used as directional couplers rather than as wave-divider-multiplexers.

An outline of the above-described optical fiber-type wave-divider-multiplexer (WDM) is shown in FIG. 6. In the drawing, reference numerals 1a and 1b denote optical fiber cladding portions; 2a and 2b denote glass portions; 3 denotes an optically coupled portion; 4 denotes a fixing member; and 5 denotes an adhesive. A melt drawing method is known as a most popular method of manufacturing the optical fiber-type WDM such as the illustrated one. This method is described in, for instance, *NEW GLASS*, vol. 6, No. 1, published in 1991, pp. 48–59. In this method, the cladding 1a and 1b of a plurality of optical fibers is partially removed to expose the glass portions 2a and 2b, and the exposed portions are then heated by a burner or the like so as to be integrated while being brought into close contact with each other. This integrated portion is further heated and is drawn, thereby forming the optically coupled portion 3. At that time, the light made incident upon one end of the optical fiber is measured at the other end thereof to detect a multiplexing and dividing characteristic (branching ratio), and drawing is stopped when a desired characteristic is obtained. Then, finally, the optical fibers are fixed to the fixing member 4 by the adhesive 5, thereby obtaining the optical fiber-type WDM such as the one shown in FIG. 6. An optical fiber-type WDM produced by this process is also known as a fiber fusion type WDM.

The optical fiber-type WDM thus manufactured has a function in which when the light of wavelengths $\lambda_1$ and $\lambda_2$ is simultaneously made incident upon an incident port, the light of the wavelength $\lambda_1$ is made emergent from an emergent port 1 and the light of the wavelength $\lambda_2$ is made emergent from an emergent port 2, thereby dividing the light into the light of the wavelengths $\lambda_1$ and $\lambda_2$. It should be noted that the optical fiber-type WDM has a multiplexing function in which the light of the wavelengths $\lambda_1$ and $\lambda_2$ made incident upon the emergent ports 1 and 2 and the illustrated port is respectively combined and is made emergent from the incident port and the illustrated port.

A description will be given of the wavelength dividing characteristic by assuming that the intensity of light made incident upon the incident port is $P_0$, the intensity of light made emergent from the emergent port 1 is $P_1$, and the intensity of light made emergent from the emergent port 2 is $P_2$. FIG. 7 is a characteristic diagram of the conventional optical fiber-type WDM described in connection with FIG. 6. In the drawing, the broken line indicates P1-P0, and the solid line indicates P2-P0. As can be seen from this diagram, P1 is large and P2 is small at the wavelength $\lambda_1$; namely, the diagram shows that most of the light of the wavelength $\lambda_1$ is outputted to the emergent port 1. With respect to the wavelength $\lambda_2$ as well, it can also be seen that the light is outputted to the emergent port 2.

The wavelength isolation which is the wavelength dividing capability is called separation, and it means that the greater the separation the greater the wavelength dividing capability. With reference to FIG. 7, for instance, the difference between the broken line and the solid line at the wavelength $\lambda_1$ shows the magnitude of the separation. As for the magnitude of the separation, 20 dB or more is desired in applications to communications, sensors, and the like. With the conventional optical fiber-type WDM, however, there is a problem in that the separation becomes small if an attempt is made to reduce a wavelength interval $\Delta\lambda(=\lambda_1-\lambda_2)$ to about 100 nm or less, or if an attempt is made to alleviate the wavelength characteristic of the light transmitter by broadening the allowable wavelength width of $\lambda_1$ and $\lambda_2$. Hence, with the conventional optical fiber-type WDM, it was possible to obtain only the separation of 15 dB or thereabout. For this reason, there has been a problem in that the dynamic range of the transmitted light is small, and the communication distance using optical fibers cannot be made long, and that it is necessary to employ expensive high-output lasers and very high-sensitivity light receivers.

In addition, if the light of a wavelength in the other channel leaks, that constitutes noise and results in a deteriorated S/N ratio, presenting a problem in image communication such as TV. In particular, if an attempt is made to ensure wavelength separation with a practical wavelength width which takes into consideration the wavelength width of a light source, a lower value than a single-wavelength assurance is obtained.

Factors which impair the dynamic range include:

(1) a loss due to the optical fiber (dependent on the distance of optical fiber communication), (2) a loss due to an intervening optical fiber-type wave-divider-multiplexer or coupling portion, (3) a decline in the SN ratio (depending on a communication system), and (4) others, including the bending loss of the optical fiber and the light source power.

Accordingly, in the optical fiber-type WDM, raise of the separation is an important issue. It is conceivable to provide an arrangement in which an optical fiber with an optical filter is connected to a fiber for photometrically measuring a divided wavelength so as to impart a wavelength selecting characteristic to the incident side or emergent side of the optical fiber-type WDM, thereby to increase the separation and improve the S/N ratio. However, the insertion of the optical fiber with an optical filter into the optical wiring of the optical fiber-type WDM means that a member having a large volume is inserted into the wiring path, and that not only is a space for installation and accommodation required, but it can be a cause of imposing limitations to the degree of freedom in the design of the wiring path. In addition, there is a problem of an increase in the coupling loss due to the insertion of the optical fiber.

SUMMARY OF THE INVENTION

The present invention has been devised with a view to overcoming the above-described problems, and its object is to provide an optical fiber-type wave-divider-multiplexer in which the separation performance is improved by inserting an optical filter in the optical fiber-type wave-divider-multiplexer.

In an optical fiber-type wave-divider-multiplexer of the present invention for dividing and multiplexing light of a plurality of mutually different wavelengths by using a plurality of optical fibers, a groove is cut in an optical-fiber fixing portion up to a point where a core of the optical fiber is cut across, and an optical filter for interrupting the light of other optical fibers which allow the light other than the light of a wavelength which passes through the relevant optical fiber to pass therethrough is inserted in the groove.

Further, an optical connector is fixed to at least one optical fiber end leading from the optical fiber-type wave-divider-multiplexer, that a groove is cut in an optical-fiber fixing portion of the optical connector up to a point where a core of the optical fiber is cut across, and that an optical filter for interrupting the light of other optical fibers which allow the light other than the light of a wavelength which passes through the relevant optical fiber to pass therethrough is inserted in the groove.

In addition, crystalline glass is used as a member for accommodating the optical fiber in the optical-fiber fixing portion.

In accordance with the present invention, in an optical fiber-type wave-divider-multiplexer for dividing and multiplexing light of a plurality of mutually different wavelengths by using a plurality of optical fibers, an optical connector is fixed to an optical-fiber fixing portion of the optical fiber-type wave-divider-multiplexer or to at least one optical fiber end leading from the optical fiber-type wave-divider-multiplexer, a groove is cut in an optical-fiber fixing portion of the optical connector up to a point where a core of the optical fiber is cut across, and an optical filter for interrupting the light of other optical fibers which allow the light other than the light of a wavelength which passes through the relevant optical fiber to pass therethrough is inserted in the groove. Therefore, the wavelength selectivity of the optical fiber-type wave-divider-multiplexer can be enhanced, so that it is possible to reduce crosstalk. In addition, since the optical filter is fitted in the optical-fiber fixing portion, a separate space for fitting the optical filter is not required, and a coupling loss due to the insertion of the optical filter does not occur.

In addition, crystalline glass is used as a member for accommodating the optical fiber in the optical-fiber fixing portion. Accordingly, groove cutting can be facilitated.

BRIEF DESCRIPTION OF THE DRAWINGS

FIGS. 4A and 4B are explanatory diagrams of a embodiment of an optical fiber fixing portion;

FIGS. 5A to 5C are explanatory diagrams of an embodiment in which the present invention is applied to the optical fiber fixing portion of the optical fiber-type wave-divider-multiplexer;

FIG. 6 is a schematic diagram of a conventional optical fiber-type wave-divider-multiplexer;

FIG. 7 is a characteristic diagram of the conventional optical fiber-type wave-divider-multiplexer explained in connection with FIG. 6; and FIG. 8 is an explanatory diagram of characteristics of a trial-manufactured product of the present invention and a commercially available product.

DETAILED DESCRIPTION OF THE PREFERRED EMBODIMENTS

Figure 1A:
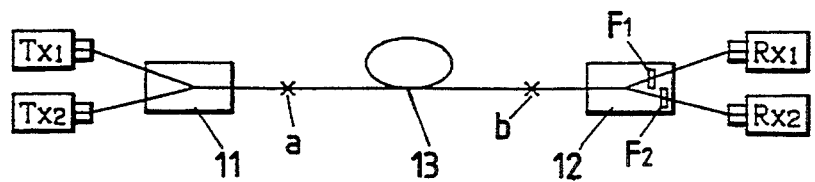
FIGS. 1A to 1C are schematic diagrams of an example of an optical fiber line using optical fiber-type wave-divider-multiplexers in accordance with the present invention.

FIG. 1 is a schematic diagram of an example of an optical fiber line using an optical fiber-type wave-divider-multiplexer (WDM) in accordance with the present invention. In the drawings, reference numerals 11 and 12 denote optical fiber-type wave-divider-multiplexers (WDM); 13 denotes an optical communication line; a and b denote coupled points; $F_1$ denotes an optical filter for cutting off a wavelength $\lambda_2$; $F_2$, an optical filter for cutting off a wavelength $\lambda_1$; $T_{x1}$, a light transmitter of the wavelength $\lambda_1$; $T_{x2}$, a light transmitter of the wavelength $\lambda_2$; $R_{x1}$, a light receiver of the wavelength $\lambda_1$; and $R_{x2}$, a light receiver of the wavelength $\lambda_2$. The optical filters $F_1$ and $F_2$ are inserted in optical fiber portions of the optical fiber-type WDM.

Figure 3A:
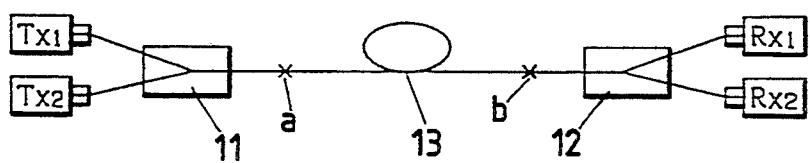
FIGS. 3A and 3B are diagrams of an optical fiber line using conventional optical fiber-type wave-divider-multiplexers which make use of two wavelengths.

The optical fiber line in FIG. 1A makes use of one optical communication line 13 as a one-way communication line for the two wavelengths $\lambda_1$ and $\lambda_2$, as explained in connection with FIG. 3A. The optical fiber-type WDM 11 is used as a wavelength multiplexer, while the optical fiber-type WDM 12 is used as a divider. Since the optical filter is inserted in the dividing-side of the optical fiber-type WDM 12 to cut off the other wavelength, the wavelength isolation can be improved by the portion of the performance of the optical filter.

Figure 1B:
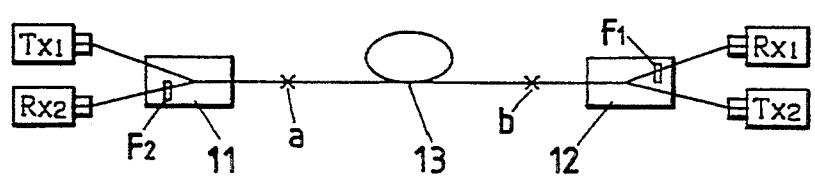
Figure 3B:
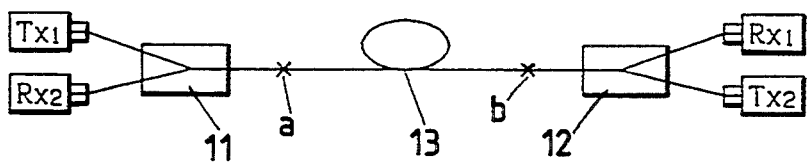

The optical fiber line in FIG. 1B makes use of one optical communication line 13 as a two-way communication line for the two wavelengths $\lambda_1$ and $\lambda_2$, as explained in connection with FIG. 3B. In this example, it suffices if the optical filter is inserted in the optical fiber on the side for outputting to each of the light receivers $R_{x1}$ and $R_{x2}$ of the optical fiber-type WDMs 11 and 12.

Figure 1C:
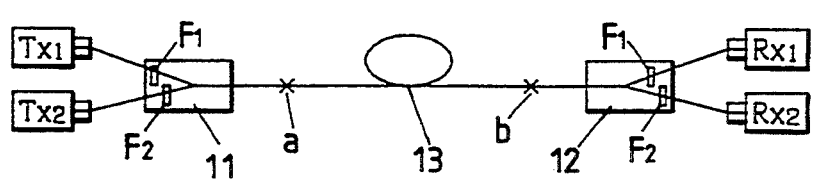

If the degree of freedom of designing a line when a general optical fiber line is laid is taken into consideration, it is preferable to insert the optical filter in all of the optical fibers on the branching side of each of the optical fiber-type WDMs 11 and 12, as shown in FIG. 1C.

Figure 2:
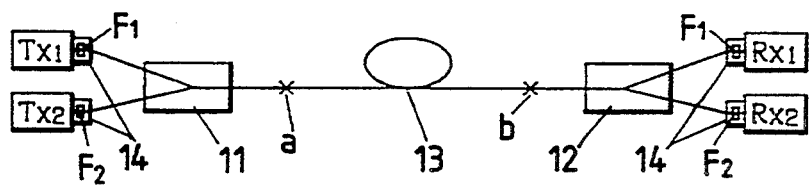
FIG. 2 is a schematic diagram of another example of the optical fiber line using the optical fiber-type wave-divider-multiplexers in accordance with the present invention.

Insertion of the optical filter into the optical fiber-type WDM is not limited to the insertion into the optical fiber portion of the dividing and multiplexing unit. In an arrangement in which the optical connector is fixed to an optical fiber end which is led out from the optical fiber-type WDM, the optical filter can be inserted into an optical-fiber fixing portion of the optical connector. FIG. 2 is a schematic diagram of an example in which the optical fiber line is arranged by inserting the optical filter into the optical-fiber fixing portion of the optical connector. In the drawing, portions similar to those of FIG. 1 will be denoted by the same reference numerals, and a description thereof will be omitted. Reference numeral 14 denotes an optical connector. In this case as well, by cutting off the other wavelength in a similar manner, the wavelength isolation can be improved by the portion of the performance of the optical filter.

FIG. 4 is an explanatory diagram of an embodiment of the optical-fiber fixing portion. In the drawing, reference numeral 2 denotes an optical fiber glass portion; 4, a fixing member; 5, an adhesive; 6, a groove; and 7, an optical filter. As explained in connection with FIG. 6, in the optical fiber-type WDM and the optical connector, a glass portion of the optical fiber is exposed generally unfailingly, and a portion for fixing the optical fiber to the optical-fiber fixing member by using an adhesive is structurally present. Accordingly, as shown in FIG. 4A, the groove 6 which reaches at least the core portion of the optical fiber from the fixing member 4 is cut in the portion where the optical fiber glass portion 2 is fixed. This groove 6 may be cut up to a position at which the optical fiber is cut across. As shown in FIG. 4B, the optical filter 7 is inserted into the cut groove 6. For practical purposes, the optical filter 7 is fixed by an optical adhesive or the like. As for the configuration of the groove, its inlet portion may preferably be provided with chamfering so as to facilitate the insertion of the optical filter 7. As a result, the optical fiber can be provided with light passing characteristics corresponding to the characteristics of the optical filter 7.

FIGS. 5A to 5C are explanatory diagrams of an embodiment in which the present invention is applied to the optical-fiber fixing portion of the optical fiber-type WDM. In the drawing, reference numerals 1a and 1b denote optical fiber cladding portions; 2a and 2b denote glass portions; 4 denotes the fixing member; and 5, the adhesive. FIG. 5A is a perspective view of the fixing portion for the optical fiber. A substantially semicylindrical member is used as the fixing member 4, and portions of the optical fiber cladding portions 1a and 1b and the glass portions 2a and 2b are fixed by the adhesive 5. The groove for insertion of the optical fiber can be cut in the fixing portion for each of the glass portions 2a and 2b, as described in connection with FIGS. 4A and 4B.

FIGS. 5B and 5C are a view of a cut along line A—A in FIG. 5A and depict different orientations for the cut groove.

FIG. 5B is a cross-sectional view in a case where the groove is cut from the lateral direction of the fixing member 4. The groove is cut from the right-hand side of the drawing, and the cut reaches a position where the optical fiber glass portion 2b is cut across illustrated by the line B—B. The optical filter is inserted into the cut groove, as explained in connection with FIG. 4. To insert the optical filter into the optical fiber 2a as well, it suffices if the groove is cut into the fixing member 4 at an axially offset position from the left-hand side of the drawing.

FIG. 5C is an embodiment in which the groove is cut from above the fixing member 4 down to a point illustrated by line C—C. If the groove is cut in this manner, optical fibers used for the optical fiber glass portions 1a and 1b can be inserted in one groove in a mutually adjacent manner.

It should be noted that in a case where a wavelength for which the wavelength isolation needs not to be increased is present, it is unnecessary to insert the optical filter. Instead, an ND filter can be inserted as an attenuator to impart a loss to an extent equivalent to a case where the optical filter is inserted, so as to equalize the loss of each line.

Conventionally, quartz glass is used as the fixing member of the optical-fiber fixing portion. However, the cutting of a groove in the quartz glass by a slicer is very difficult since the quartz glass is an anisotropic brittle material. In the light of facilitating the cutting of the groove, crystalline glass is suitable and facilitates the cutting of the groove. In addition, as the optical-fiber fixing member, a plastic, ceramic, stainless steel, or the like is sometimes used. These materials permit groove cutting by the slicer without a problem.

The optical fiber-type wave-divider-multiplexer (WDM) with optical filters in accordance with the present invention was trial-manufactured, and results of comparison of typical characteristics between the same and a commercially available product are shown in FIG. 8. It was found that, as compared with the commercially available products, the trial-manufactured product in accordance with the present invention displayed a slightly deteriorated insertion loss due to the insertion of the optical filter, but its dynamic range can be improved remarkably since the wavelength isolation is improved remarkably.

As described above, in accordance with the present invention, the wavelength isolation can be improved remarkably by inserting the optical filter into the optical fiber-type wave-divider-multiplexer and its coupled portion (optical connector) by making use of their inherent structures as they are. Accordingly, since an optical communication path with a satisfactory separation characteristic can be obtained, it is possible to allow one optical fiber line to carry a plurality of channels, so that an economic communication network can be structured.

Furthermore, it is advantageous if the optical fiber-type wave-divider-multiplexer in accordance with the present invention is utilized in image optical communications in which the S/N ratio is important, particularly in optical communication for high-definition TV, so that large expectations can be placed in the future.

What is claimed is:

1. An optical fiber-type wave-divider-multiplexer device for dividing and multiplexing light of a plurality of different wavelengths, said device comprising:

an optical fiber fusion type wave-divider-multiplexer (WDM), said optical fiber fusion type WDM including a plurality of optical fibers having an integrated optically coupled portion;

a groove cut in an optical-fiber fixing portion of a particular optical fiber of said plurality of optical fibers up to a point where a core of said particular optical fiber is cut across, said particular optical fiber having an associated wave length; and an optical filter inserted in said groove, said optical filter cutting off light of at least one wavelength which corresponds to other optical fibers and allowing light at said associated wavelength to pass through said particular optical fiber.

2. An optical fiber-type wave-divider-multiplexer device as claimed in claim 1, wherein crystalline glass is used as a member for accommodating said particular optical fiber in said optical-fiber fixing portion.

3. An optical fiber-type wave-divider-multiplexer device for dividing and multiplexing light of a plurality of different wavelengths, said device comprising:

an optical fiber fusion type wave-divider-multiplexer, said optical fiber fusion type wave-divider-multiplexer including a plurality of optical fibers having an integrated optically coupled portion;

an optical connector fixed to an end of at least one of said plurality of optical fibers leading from said optical fiber fusion type wave-divider-multiplexer;

a groove cut in an optical-fiber fixing portion of said optical connector up to a point where a core of said optical fiber fixed to said optical connector is cut across; and an optical filter inserted in said groove, said optical filter cutting off light of at least one wavelength which corresponds to other optical fibers and allowing light of a wavelength associated with said optical fiber fixed to said optical connector to pass therethrough.

4. An optical fiber-type wave-divider-multiplexer device as claimed in claim 3, wherein crystalline glass is used as a member for accommodating said optical fiber in said optical-fiber fixing portion.

* * * * *